(12) United States Patent
Deas (10) Patent No.: US 7,962,042 B2
(45) Date of Patent: Jun. 14, 2011

(54) METHOD AND SYSTEM FOR DELIVERING BROADBAND SERVICES OVER AN ULTRAWIDE BAND RADIO SYSTEM INTEGRATED WITH A PASSIVE OPTICAL NETWORK

(75) Inventor: David A. Deas, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 236 days.

(21) Appl. No.: 10/384,379

(22) Filed: Mar. 7, 2003

(65) Prior Publication Data

US 2004/0175173 A1 Sep. 9, 2004

(51) Int. Cl.
*H04B 10/00* (2006.01)

(52) U.S. Cl. ........................................................ 398/115

(58) Field of Classification Search .................... 398/42, 398/139, 66, 67–68, 63, 115
See application file for complete search history.

(56) References Cited

U.S. PATENT DOCUMENTS

| | | | | |
|---|---|---|---|---|
| 5,332,927 A | * | 7/1994 | Paul et al. | 307/66 |
| 5,610,907 A | | 3/1997 | Barrett | |
| 5,621,841 A | * | 4/1997 | Field | 385/113 |
| 5,745,627 A | * | 4/1998 | Arroyo et al. | 385/101 |
| 5,754,555 A | | 5/1998 | Hurme et al. | |
| 5,761,351 A | | 6/1998 | Johnson | |
| 5,773,817 A | | 6/1998 | Kingsley et al. | |
| 5,812,081 A | | 9/1998 | Fullerton | |
| 5,917,624 A | * | 6/1999 | Wagner | 398/71 |
| 5,929,538 A | * | 7/1999 | O'Sullivan et al. | 307/66 |
| 6,147,786 A | | 11/2000 | Pan | |
| 6,151,144 A | | 11/2000 | Knox | |
| 6,160,802 A | | 12/2000 | Barrett | |
| 6,492,904 B2 | | 12/2002 | Richards | |
| 6,493,335 B1 | | 12/2002 | Darcie et al. | |
| 6,505,032 B1 | * | 1/2003 | McCorkle et al. | 455/41.2 |
| 6,512,488 B2 | | 1/2003 | Schantz | |
| 6,535,331 B2 | | 3/2003 | Shiota et al. | |
| 6,549,587 B1 | | 4/2003 | Li | |
| 6,643,417 B2 | | 11/2003 | Strutz et al. | |

(Continued)

FOREIGN PATENT DOCUMENTS

EP 0994582 A1 4/2000

(Continued)

OTHER PUBLICATIONS

G. Lambertsen et al., "PON Mobile Access Network Without Mobile IP FA Switchover", IEEE, 2002.*

(Continued)

*Primary Examiner* — Shi K Li
(74) *Attorney, Agent, or Firm* — Toler Law Group (57) ABSTRACT

A system and method for providing ultrawide band (UWB) communications service including voice, data, and video signals to a number of neighboring dwelling units or community access centers via a Passive Optical Network (PON) are presented. A neighborhood pedestal can be provided to serve multiple neighboring dwelling units equipped with user access. Public access centers can provide an ultrawide band signal via a PON to reach a plurality of signal receiving locations to serve a community of users. Electrical power to an UWB device may be supplied via an electrical power grid. Alternately, due to the low power consumption of UWB devices, a solar panel, or metallic-sheathed fiber cable with a center metallic member may be utilized to deliver power to the PON/UWB devices.

11 Claims, 8 Drawing Sheets

U.S. PATENT DOCUMENTS

| | | | |
|---|---|---|---|
| 6,721,797 B1 | 4/2004 | Kim | |
| 6,735,238 B1 | 5/2004 | McCorkle | |
| 6,757,251 B1 | 6/2004 | Nakaishi | |
| 6,782,048 B2* | 8/2004 | Santhoff | 375/240 |
| 7,103,907 B1* | 9/2006 | Buabbud | 725/129 |
| 2002/0064221 A1* | 5/2002 | Yeap et al. | 375/222 |
| 2003/0007214 A1* | 1/2003 | Aburakawa et al. | 359/145 |
| 2003/0099015 A1* | 5/2003 | Kelly et al. | 359/127 |
| 2003/0138061 A1 | 7/2003 | Li | |
| 2003/0180049 A1* | 9/2003 | Park | 398/72 |
| 2003/0228005 A1* | 12/2003 | Melick et al. | 379/93.01 |
| 2003/0235236 A1 | 12/2003 | Santhoff | |
| 2004/0005016 A1* | 1/2004 | Tewfik et al. | 375/302 |
| 2004/0008617 A1* | 1/2004 | Dabak et al. | 370/208 |
| 2004/0047313 A1* | 3/2004 | Rumpf et al. | 370/335 |
| 2004/0081402 A1 | 4/2004 | Ouchi | |
| 2004/0143428 A1 | 7/2004 | Rappaport et al. | |
| 2004/0187156 A1 | 9/2004 | Palm et al. | |
| 2004/0264974 A1 | 12/2004 | Sorenson | |
| 2005/0213974 A1 | 9/2005 | Deas | |
| 2005/0244158 A1* | 11/2005 | Luft | 398/59 |

FOREIGN PATENT DOCUMENTS

| | | |
|---|---|---|
| JP | 60-139360 | 9/1985 |
| JP | 61-027510 | 2/1986 |
| JP | 02-201818 | 8/1990 |
| JP | 02201818 A | 8/1990 |
| JP | 08-129915 | 5/1996 |
| JP | 08129915 A | 5/1996 |
| JP | 09-043010 | 2/1997 |
| JP | 09043010 A | 2/1997 |
| JP | 11-146446 | 5/1999 |
| JP | 2001-067948 | 3/2001 |
| JP | 2001067948 A | 3/2001 |
| JP | 2001-156734 | 6/2001 |
| JP | 2001-156790 | 6/2001 |
| JP | 2001-156824 | 6/2001 |
| JP | 2001156734 A | 6/2001 |
| JP | 2001156824 A | 6/2001 |
| JP | 2001-251252 | 9/2001 |
| JP | 2001-308899 | 11/2001 |
| JP | 2001-320348 | 11/2001 |
| JP | 2001320348 A | 11/2001 |
| JP | 2002-116357 | 4/2002 |
| JP | 2002116357 A | 4/2002 |
| JP | 2002-186017 | 6/2002 |
| JP | 2002351766 A | 6/2002 |
| JP | 2002-198905 | 7/2002 |
| JP | 2002-238160 | 8/2002 |
| JP | 2002-261697 | 9/2002 |
| JP | 2002-351766 | 12/2002 |
| JP | 2002-366340 | 12/2002 |
| JP | 2003-006623 | 1/2003 |
| JP | 2003-006775 | 1/2003 |
| JP | 2003006775 A | 1/2003 |
| JP | 2003-046542 | 2/2003 |
| JP | 2003046542 A | 2/2003 |
| JP | 2004-507905 | 3/2004 |
| JP | 2004-525543 | 8/2004 |
| KR | 10-2002-0036084 | 1/2004 |
| WO | 0193434 A2 | 12/2001 |

OTHER PUBLICATIONS

"Newton's Telecom Dictionary 14th Edition", Mar. 1998, p. 723.*

Foerster, Jeff, et al., "Ultra-Wideband Technology for Short- or Medium-Range Wireless Communications," Intel Technology Journal Q2, 2001, pp. 1-11.

Kapovits, Adam, "Integration of Broadband Radio Drops into FSAN Access Systems," presented at ISSLS 2002, Seoul, Korea, Apr. 14-18, 2002, 12 pp. [online] [Retrieved from the Internet Mar. 7, 2003 @ <http://www.issls.council.org/proc02/papers/S4A3m.pdf>.

Mukherjee, Somnath, "Combining HFCs and Fixed Wireless for Broadband Deployment," TechWeb, Sep. 25, 2002, 5 pp. [online] [Retrieved from the Internet Dec. 18, 2002 @ <http://www.techweb.com/wire/story/OEG20020925S0005>.

Partyka, Jeff, "Global Telcos Aim to Bring Fiber to Home," The Industry Standard, Jun. 22, 1999, 1 p. [online] [Retrieved from the Internet Dec. 18, 2002 @ <http://www.thestandard.com/article/0,1902,5249,00.html>.

"XtremeSpectrum Demonstrates Industry's First Ultra-wideband Product," Xtreme-Spectrum press release, San Francisco, CA, Jul. 16, 2002, 3 pp. [online] [Retrieved from the Internet Dec. 10, 2002 @ <http://www.xtremespectrum.com/press/pressJuly162002.html>.

"Trinity for Media-rich Wireless Applications" XtremeSpectrum Product Brief, Jun. 24, 2002, 3 pp. [online] [Retrieved from the Internet Mar. 7, 2003 @ <http://www.xtremespectrum.com/products/prodbriefs.html>.

"Passive Optical Networks Bring Broadband to the Local Loop," Pirelli, Aug. 27, 2002, 5 pp. [online] [Retrieved from the Internet Mar. 7, 2003 @ <http://www.pirelli.corn/en_42/cables_systems/telecom/product_solutionsffttx_solution/poninlocalloop.pm.pdf>.

"Pulse~LINK Wireless Optimized Air Interface (OAI)," Pulse-LINK product sheet, Jul. 2, 2002, 4 pp. [online] [Retrieved from the Internet Dec. 10, 2002 @ <http://www.pulselink.net/optimized-air-interface.html>.

"Bringing Broadband to the Home: More Steam for Internet Access," International Telecommunication Union Press Release Nov. 19, 2001, 1 pp. [online] [Retrieved from the Internet Dec. 18, 2002 @ <http:/www.itu.int/newsarchive/press_releases/2001/27.html>.

Greenfield, David, "Passive Optical Networks," Network Magazine, Dec. 5, 2001, 4 pp.,[online] [Retrieved from the Internet Dec. 17, 2002 @ <http:/www.networkmagazine.com/article/printableArticle?doc_id=NMG20011203S0021>.

"Question 2/15—Optical Systems for Access Networks," International Telecommunication Union Study Group, Feb. 4, 2003, 3 pp. [online] [Retrieved from the Internet Mar. 7, 2003 @ <http://www.itu.int/ITU-T/studygroups/com15/_page.print>.

Fontana, R., et al. Recent Advances in Ultra Wideband Communications Systems, IEEE Confrences on Ultra Wideband Systems and Technologies, 2002, p. 129.

Nardis, L., et al. UWB Ad-Hoc Networks, IEEE Conference on Ultra Wideband Systems and Technologies, 2000, pp. 219-220.

Izadpanah, H. A Millimeter-Wave Broadband Wireless Access Technology Demonstrator for the Next-Generation Internet Network Reach Extension, IEEE Communications Magazine, Sep. 2001, Fig. 1.

International Search Report for International Application No. PCT/US04/04931, Mailed on Dec. 14, 2004.

Written Opinion of the International Searching Authority for International Application No. PCT/US04/04931, Mailed on Dec. 14, 2004.

European Supplementary Search Report for European Publication No. 1602183, dated Mar. 25, 2008.

European Office Action for European Application No. 04 712 402.9-2415, dated Sep. 16, 2008.

Translation of Japanese Office Action, dated Jun. 24, 2008.

Translation of Mexican Office Action, dated Feb. 10, 2009.

Summary of a Notice of Preliminary Rejection for Korean Patent Application No. 10-2005-7015983, 3 pp., dated Jun. 11, 2010.

Notice of Grounds for Rejection for Japanese Patent Application No. 2006-508771, 6 pp., dated Jun. 24, 2008.

Notice of Grounds for Rejection for Japanese Patent Application No. 2006-508771, 5 pp., dated Sep. 29, 2009.

* cited by examiner

METHOD AND SYSTEM FOR DELIVERING BROADBAND SERVICES OVER AN ULTRAWIDE BAND RADIO SYSTEM INTEGRATED WITH A PASSIVE OPTICAL NETWORK

BACKGROUND

1. Field of the Invention

The present invention relates generally to ultrawide band communication, and specifically to the provision and delivery of ultrawide band communication services via wireless delivery.

2. Description of the Related Art

Research efforts in ultrawide band (UWB) apparatus were initiated in military research laboratories in the United States and Europe in the 1950s-1960s. The military's primary interest was development of UWB technology as a means of "seeing" through trees and other obstructions that would not be possible utilizing conventional radar systems.

Ultrawide band uses very short duration pulses, in the billionths or trillionths of a second duration, which provides excellent range resolution at a lesser cost than conventional radars. Each pulse covers several gigahertz of radio spectrum, with information being transmitted by modulating the timing, amplitude, polarity, or other aspect of the pulses. The location of an object, to within centimeters, is inferred utilizing methods employed in conventional radars, e.g., echo return timing, target triangulation, and the like. This precise location technology has been demonstrated in automotive collision warning systems, through-wall sensing applications, soil-characterization, and industrial level measurement, amongst others.

Until recently, UWB was constrained by regulatory restrictions in the United States and abroad. However, with the relaxation of these regulations, and the inclusion of UWB into communication standards, interest from the private sector has expanded to transfer this technology into commercial production. One particular area where UWB commercialization may be viable is in the field of high-speed communications. While conventional UWB methods and systems may be suitable for military uses, such implementations do not yet meet the needs of commercial communications applications, including robust customer delivery, scalability, ease of maintenance, flexibility, and overall system and service operation.

Accordingly, there is a need for improved ultrawide band methods, systems, and devices that may be deployed in commercial applications.

SUMMARY

In a particular embodiment, a system is provided that includes a wave division multiplexer, optical signal to electrical signal converters, and an ultra wide band communication device responsive to the optical signal to electrical signal converters. In another embodiment, the system includes an optical signal carrier and an ultra wide band communication device responsive to the optical signal carrier.

In another embodiment, a communication system is disclosed that includes a first input to receive a signal derived from an optical signal, an ultra wide band transceiver responsive to the first input, and an antenna responsive to the ultra wide band transceiver. The antenna is positioned to provide a wireless signal to reach a plurality of different signal receiving locations.

In another embodiment, a user access communication device is disclosed that includes an antenna, an ultra wide band transceiver responsive to the antenna, the ultra wide band transceiver producing an output signal, and a user interface to convert the output signal to voice, video, and data signals.

In a further embodiment, a method of communicating wireless ultra wide band signals is disclosed. The method includes receiving a first wireless signal at an ultra wide band receiver, converting the received signal to an optical signal, and communicating the optical signal over an optical facility.

In another embodiment, a communication device is disclosed that includes a power source input and an ultra wide band transceiver responsive to the power source input. The power source input is configured to receive energy carried over a metallic sheathed fiber cable that includes a center metallic member. In another embodiment, the communication device includes a power source input where the power source input is configured to receive energy carried over a set of appropriately gauged interstitial copper pairs. In a further embodiment, the power source input is configured to receive energy transformed by a power transformer after being carried over an electrical power grid.

In another embodiment, a communication access center is disclosed that includes an optical facility, an optical cable to carry an optical signal from the optical facility, an ultra wide band transceiver responsive to the optical signal, and an antenna responsive to the ultra wide band transceiver.

BRIEF DESCRIPTION OF THE DRAWINGS

Specific embodiments are shown and described in the drawings presented herein. It will be appreciated that for simplicity and clarity of illustration, elements illustrated in the Figures have not necessarily been drawn to scale. For example, the dimensions of some of the elements are exaggerated relative to other elements for clarity. The use of the same reference symbols in different drawings indicates similar or identical items, and wherein.

DETAILED DESCRIPTION OF THE DRAWINGS

The present disclosure is generally directed to an ultrawide band (UWB) communications system, devices, and methods.

Figure 1:
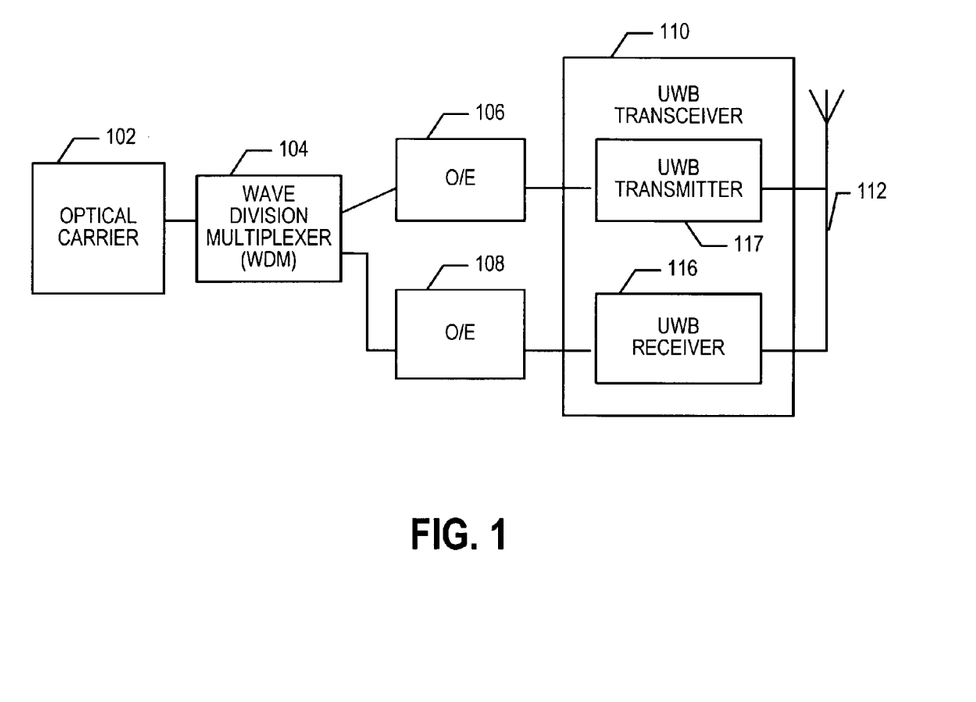
FIG. 1 is a simplified block diagram of an integrated Passive Optical Network/Ultrawide Band communication system (PON/UWB)

Specifically, FIG. 1 illustrates, in simplified block diagram form, an overview of a UWB communication system. The UWB communication system comprises optical signal carriers 102, operably coupled to a wavelength division multiplexer 104, which is coupled to optical signal to electrical signal (O/E) converters 106 and 108, respectively. In a particular illustrative embodiment, the optical signal input from optical carrier 102 to the O/E converters 106 and 108 is carried via a passive optical network (PON). In other embodiments, the optical signal input from optical carrier 102 is carried to the O/E converters 106 and 108 via a wave division multiplexer (WDM) 104.

Optical signal to electrical signal (O/E) converter 106 has an input to a UWB transmitter 117, while O/E converter 108 has an input from a UWB receiver 116. Transmitter 117 and receiver 116 are part of an ultrawide band communication transceiver 110. Transceiver 110 includes an ultrawide band modulator (shown in FIG. 7), and transceiver 110 employs a bandwidth that is typically greater than 2 gigahertz during operation. In a particular embodiment, an ultrawide bandwidth modulation technique responsive to the optical signal from the optical carrier 102 is employed by transceiver 110. An illustrative modulation technique utilizes pulse position modulation during system operation.

An antenna 112 is included with transceiver 110, and is coupled to transmitter 117 and receiver 116. The antenna 112 is responsive to the UWB communication transceiver device 110, and enables transmission/receipt of communication information. The communication information may be data, video signals, audio signals, voice signals, and the like.

Figure 2:
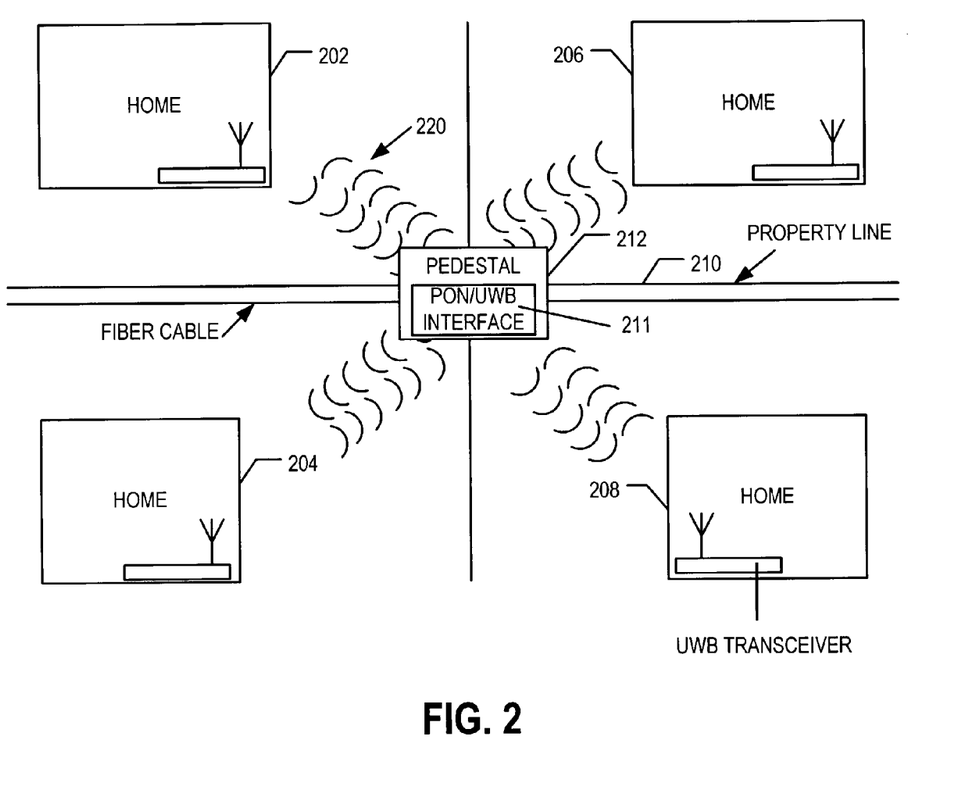
FIG. 2 is a block diagram illustrating the application of integrated PON/UWB communication services to a neighborhood area.

The system disclosed herein offers the flexibility to provide high-speed digital communications service to a plurality of different signal receiving locations such as a neighborhood, without the need for additional wiring or cabling to be run to each individual dwelling unit. This may be accomplished by use of a pedestal-type of equipment housing. Referring to FIG. 2, a block diagram illustrating an embodiment of the provision of UWB communication services to a neighborhood area is shown.

With the neighborhood concept or cluster as disclosed herein, dwelling units in proximate locations, e.g., homes 202, 204, 206, and 208 located on their respective lots, are separated by a property line having an easement area such as, easement area 210. Easement area 210 is located adjacent to the property line of the various dwellings 202, 204, 206 and 208 and contains the cabling to carry the optical signals to the equipment housing or pedestal 212 disposed within the easement area 210. In a particular illustrative embodiment, cabling is a fiber optic cable which is part of a passive optical network.

The optical facility of pedestal 212 contains a passive optical network PON/UWB interface 211. The passive optical network/UWB interface 211 in pedestal 212 comprises a first input to receive a signal derived from an optical signal and an ultrawide band transceiver responsive to the first input. In addition, an antenna responsive to the UWB transceiver is positioned to provide a wireless signal 220 to each of the respective dwelling units 202-208.

Because of the relatively short range of UWB broadcast signals, it is desirable to situate the pedestal 212 centrally to a cluster, in this example, a cluster of dwellings 202-208. Hence pedestal 212 can be considered a neighborhood pedestal to serve neighboring dwelling units such as units 202-208. In order to access the transmitted wireless signal, each of the proximate respective dwelling units 202-208 would be equipped with a user access interface, e.g., an UWB transceiver and antenna, indicated by the respective rectangles with antenna trees within each dwelling unit 202-208. Each dwelling unit 202-208 so equipped would be capable of utilizing the UWB communications provided by the neighborhood pedestal 212. The user access interface is presented in further detail in FIG. 4, while details of the neighborhood pedestal 212 are presented in FIG. 3.

Figure 3:
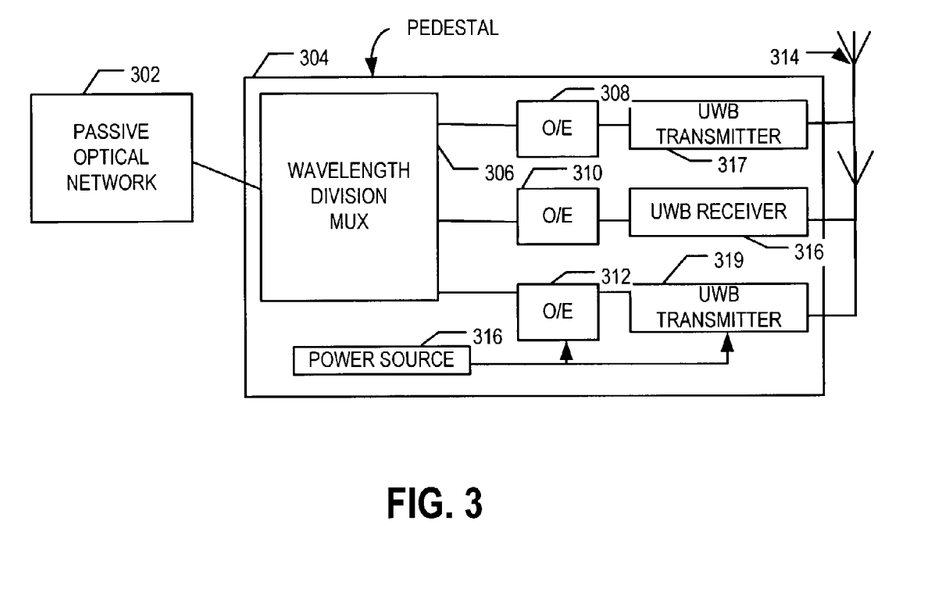
FIG. 3 is a simplified block diagram of an integrated PON/UWB communication system delivering data from multiple sources via different wavelengths.

An example of a transceiver 304 for use in connection with the neighborhood pedestal 212 is illustrated in the block diagram of FIG. 3. Transceiver 304 includes a wavelength division multiplexor 306, a power source 316, optical signal to electrical signal converters 308, 310, and 312, UWB transmitters 317 and 319, an UWB receiver 316, and antenna 314. In a particular embodiment, an optical signal is provided to wavelength division multiplexor 306 by the passive optical network 302. As previously discussed, in other embodiments, the optical signal may be carried by a Passive Optical Network (PON) consistent with ITU-T, G.983.1, G.983.2, and G.983.3 standards.

With the technique of multiplexing, various optical carrier signals are multiplexed by using different wavelengths to carry different signals. Wavelength division multiplexor 306 receives the signals, which are sent to respective optical signal to electrical signal (O/E) converters 308, 310, and 312. O/E converters 308-312 may be used to convert voice/data signals, voice/data and video signals, or video signals. For example, O/E converter 308 can convert a voice/data signal from optical to electrical and pass the signal to UWB transmitter 319, which, in turn, sends the signal to antenna 314. O/E converter 312 can convert a video signal from optical to electrical, and pass the converted electrical signal to UWB transmitter 317. UWB transmitter 317 sends the converted video signal to antenna 314 for broadcast. Because the system is two-way, i.e., transmit and receive, signals from antenna 314 are received by UWB receiver 316, passed to O/E 310, converted to an optical signal, and sent to wavelength division multiplexor 306 for coupling and transmission to the passive optical network 302.

Figure 4:
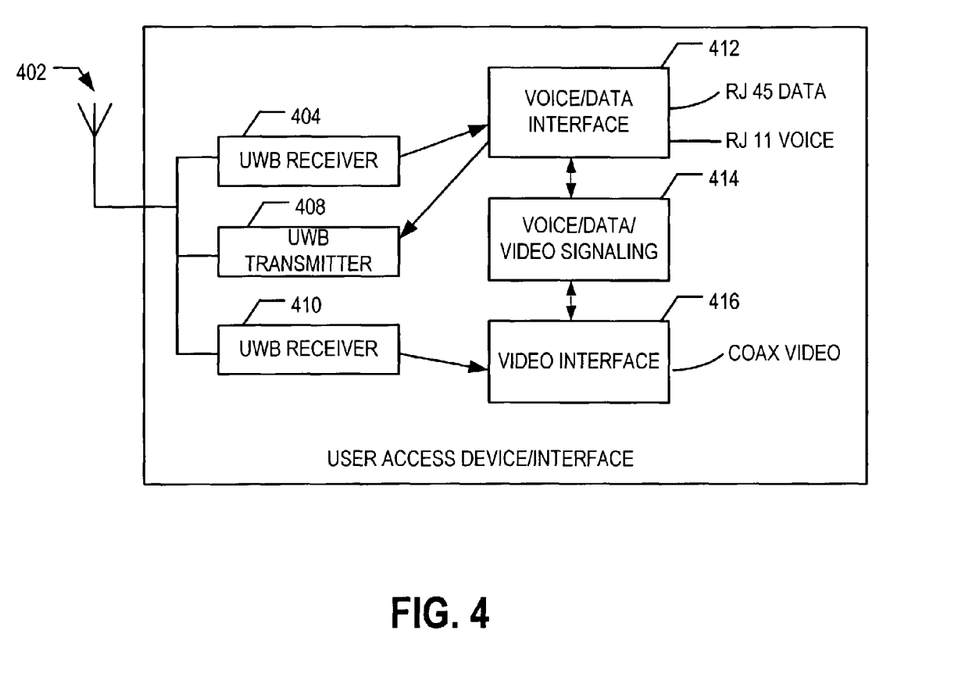
FIG. 4 is a simplified block diagram of a UWB communication system user access device with the appropriate voice, data, and video interfaces.

An example of a user access communication device for the communications system disclosed herein is shown in the block diagram of FIG. 4. The user access communication device comprises an antenna 402 and a UWB transceiver producing output signals. The UWB transceiver comprises a UWB receiver 404, a UWB transmitter 408, and a UWB receiver 410. The user access communication device serves to convert received signals into voice, data, and video signals.

UWB receivers 404 and 410 receive wireless signals from antenna 402. UWB receiver 404 is connected to a voice/data interface 412 for converting the output signal from UWB receiver 404 to voice/data downstream information. Voice/data interface 412 may utilize RJ 45, RJ 11, or other suitable means known in the art to allow the user to access the voice/data information.

UWB receiver 410 is connected to a video interface 416. Video interface 416 converts the signal from UWB receiver 410 into a video downstream signal for viewing. Video interface 416 may utilize coaxial cable or other means known in the art to allow the user to view the received video, such as via a television set, video monitor, or other display device (not illustrated).

In addition, a user access interface comprising a bi-directional voice/data/video signaling interface 414 is coupled to both UWB transmitter 408 and UWB receiver 404 to provide voice/data/video signaling to UWB transmitter 408 and UWB receiver for transmission and reception via antenna 402 to the transceiver of pedestal 212 (FIG. 2), to thereby provide for a two-way communication system. Voice and/or data signals input for outbound transmission may be accomplished via standard telephony and/or data signals, or other means as are known in the art.

Figure 5A:
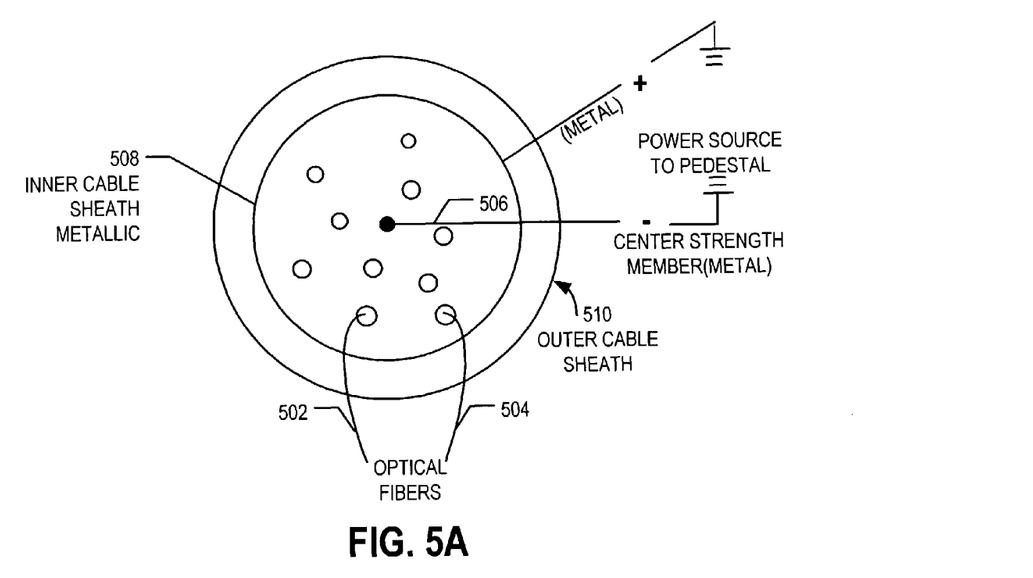
FIG. 5A and FIG. 5B illustrate cross-sectional views of power source inputs for an integrated PON/UWB communication device.

Due to the low power demands of ultrawide band, the system may be powered economically. In a particular embodiment, the power source input for power source 316 (FIG. 3) could be configured to receive energy carried over a metallic sheathed fiber cable, as seen in FIG. 5A. The power source cable comprises an inner cable metallic sheath 508, surrounded by an outer cable sheath 510. A plurality of optical fibers 502, 504 are located within the space defined by the inner cable metallic sheath 508. A metallic center member 506 is located at the center region of the cable. If the metallic center member 506 has a negative voltage, and the inner cable metallic sheath 508 has a positive voltage, sufficient current to power the necessary components, e.g., the PON/UWB interface of pedestal 212, would be realized.

Figure 5B:
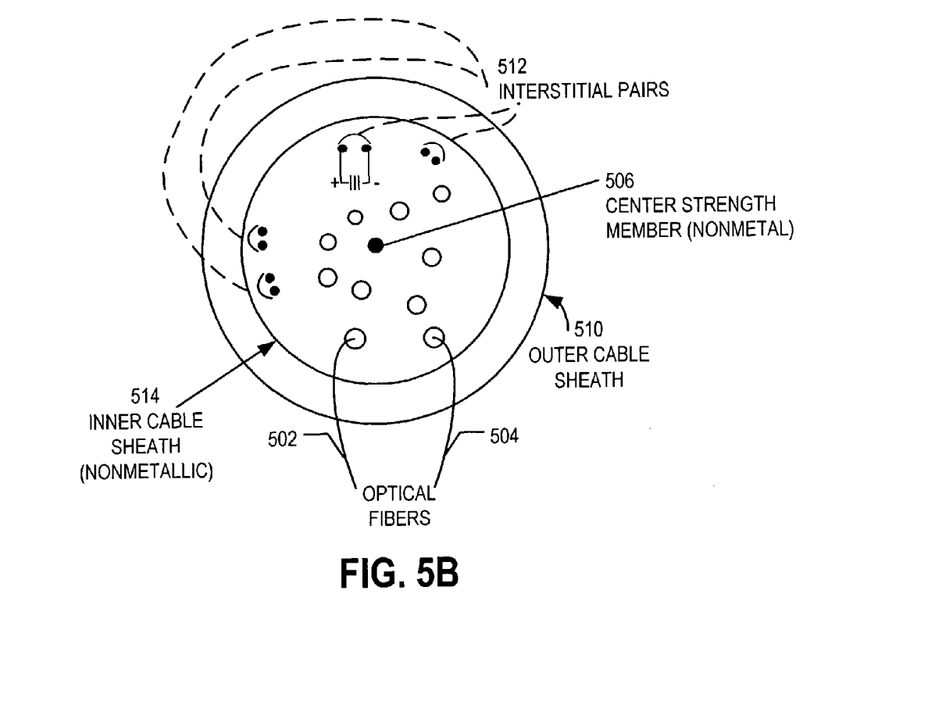

In another embodiment shown in FIG. 5B, the power source input could be configured to receive energy carried over a set of interstitial gauged copper pairs 512. In this particular embodiment, the center member 506 and the inner cable sheath 514 may be non-metallic. As before, however, a plurality of optical fibers 502 and 504 would be included within the inner cable sheath 506. The electrical energy carried by the interstitial pairs 512 could be used to provide power to a PON/UWB interface of pedestal 212, would be realized.

Figure 6:
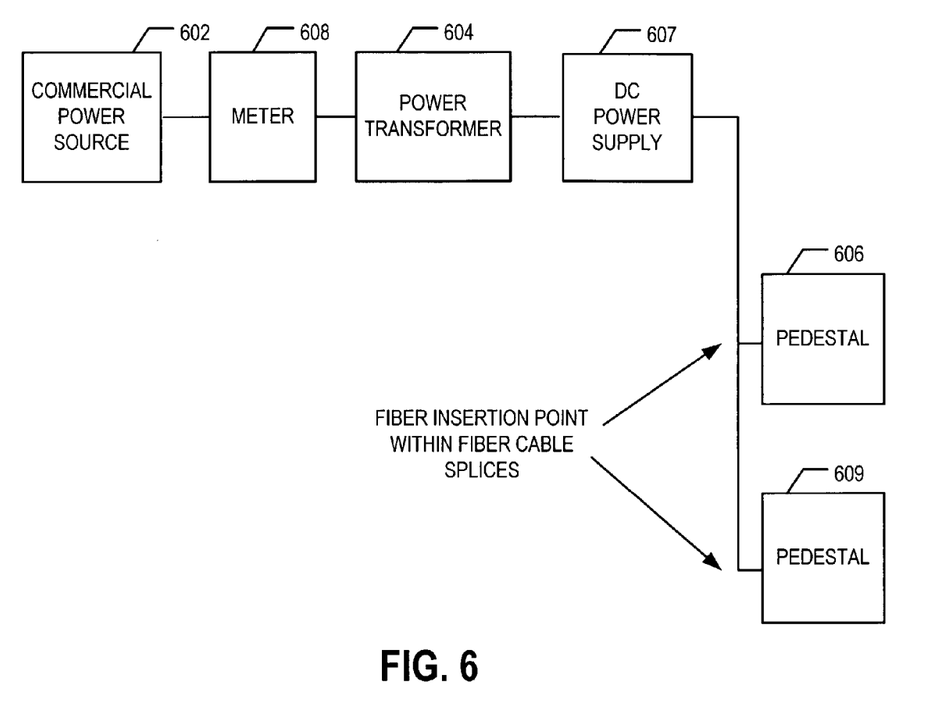
FIG. 6 is a block diagram illustrating the utilization of a commercial power source for a UWB communication device.

In climates favorable for the use of solar power, power to the UWB transceiver could be supplied by solar panels with appropriate battery back-up power. The low power demands of a PON/UWB system make this embodiment suitable for commercial implementation. Alternately, a power source input for a PON/UWB system can be configured to utilize power carried over a commercial electrical grid, as shown in FIG. 6. The power source configuration of this embodiment comprises a commercial power source 602, an electrical meter 608 for determining power consumption (i.e., kW hours), a power transformer 604, and a DC power supply 607 at the fiber cable insertion point of pedestal 606 and 609.

Figure 7:
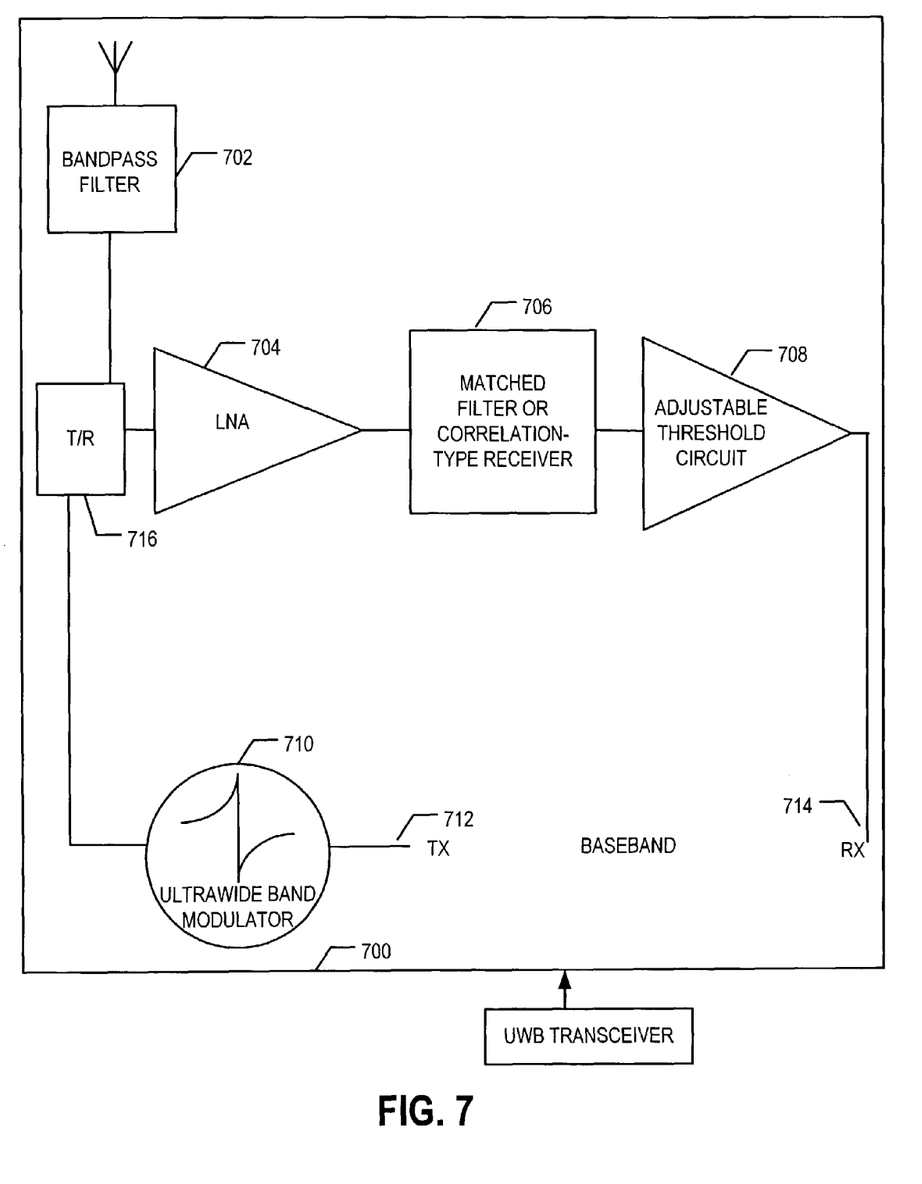
FIG. 7 is a circuit diagram illustrating an example of a typical PON/UWB transceiver architecture.

FIG. 7 is a simplified circuit diagram illustrating an example UWB transceiver architecture according to an illustrative embodiment. The communications information may be modulated using several different techniques. For example, the pulse amplitude could be modulated with +/−1 variations (bipolar signaling), or +/−M variations (M—any Pulse Amplitude Modulation), turning the pulse on and off (On/Off Keying, or OOK), or dithering the pulse position, known as Pulse Position Modulation, or PPM. An ultrawide band modulator 710 for shifting information bits 712 is provided for operation in transmit mode.

In receive mode, the energy collected by the antenna 711 is filtered by a bandpass filter 702, sent through a low-noise amplifier 704 via transmit/receive switch 716, and passed through either a matched filter or a correlation-type receiver 706. A matched filter has an impulse matched to the received pulse shape and will produce an impulse at its output when presented with RF energy which has the correct (matching) pulse shape. The original information 714 is then recovered with an adjustable high-gain threshold circuit 708.

Figure 8:
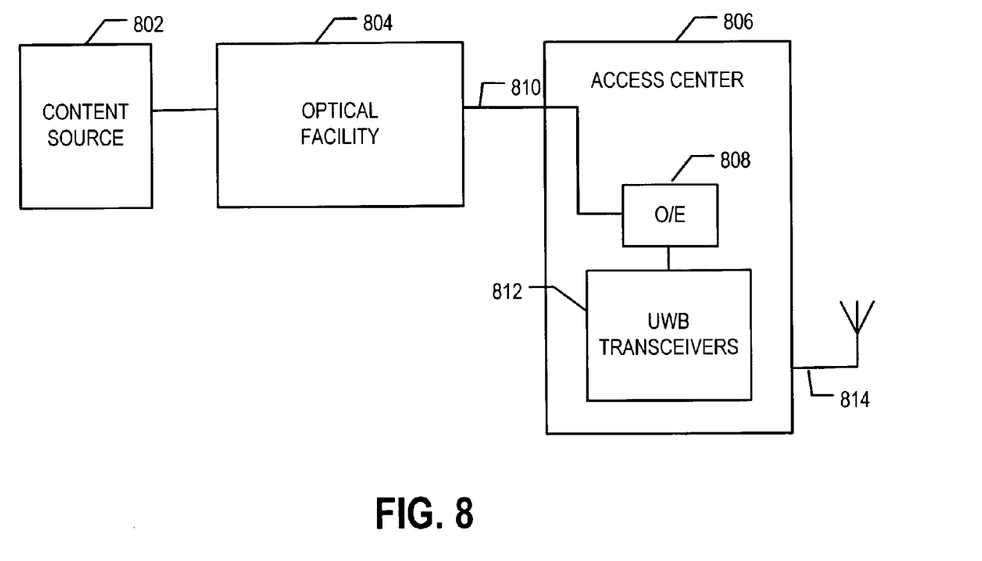
FIG. 8 is a simplified block diagram of a PON/UWB communications community access point.

Another embodiment encompasses a communication access center as shown in the block diagram of FIG. 8. The communication access center comprises a content source 802 for providing through an optical facility 804. An optical cable 810 carries an optical signal from the optical facility 804 to the access center 806. Access center 806 has an O/E converter 808 and supplies a converted signal to and from a UWB transceiver 812. The UWB transceiver is coupled to an antenna 814.

In a particular embodiment, antenna 814 is positioned to provide a wireless signal to reach a plurality of signal receiving locations. The community access center 806 could be implemented in a location to serve a community of users, for example, in a public or private recreation center, a public library, or an Internet café, to name but a few.

The method, system, and apparatus described herein provide for a flexible implementation. Although the invention has been described using certain specific examples, it will be apparent to those skilled in the art that the invention is not limited to these few examples. Additionally, various types of ultrawide band transceivers, transmitters, receivers, and power supplying devices are currently available which could be suitable for use in employing the methods as taught herein. Note also, that although certain illustrative embodiments have been shown and described in detail herein, along with certain variants thereof, many other varied embodiments may be constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A system to wirelessly distribute video information, voice information, and data by a short range, centrally located ultra wide band communications system to a plurality of nearby dwellings powered by a commercial electrical grid, the system comprising:

a wavelength division multiplexer to receive an optical signal from an optical cable of a passive optical network that provides the video information, the voice information, and the data to the ultra wide band communications system, the optical signal including an optical carrier signal multiplexed using at least a first wavelength and a second wavelength, the wavelength division multiplexer to wavelength de-multiplex the received optical signal into a first optical signal at the first wavelength including the voice information and the data and a second optical signal at the second wavelength including the video information, wherein the optical cable includes a non-metallic inner sheath and optical fiber insertion points;

a first optical signal to electrical signal converter configured to convert the first optical signal to a first electrical signal including the voice information and the data;

a second optical signal to electrical signal converter configured to convert the second optical signal to a second electrical signal including the video information;

a set of interstitial gauged copper pairs to receive power via at least one of a connection to an electrical power grid, a backup battery, and a solar panel;

an ultra wide band communication device to produce a first ultra wide band transmitted signal based on the first electrical signal and including the voice information and the data and to produce a second ultra wide band transmitted signal based on the second electrical signal and including the video information, wherein the ultra wide band communication device includes an ultra wide band transmitter, and wherein the ultra wide band transmitter has a bandwidth of at least 2 GHz;

a pedestal-type equipment housing that houses the ultra wide band communication device; and an antenna positioned inside the pedestal-type equipment housing to wirelessly distribute the video information, the voice information, and the data to at least one user access device in the plurality of nearby dwellings, the at least one user access device comprising:
- a second antenna to receive the video information, the voice information, and the data;
- a first ultra wide band receiver and an ultra wide band transmitter coupled to an interface, the interface including an RJ45 connector to access the data and an RJ11 connector to access the voice information;
- a second ultra wide band receiver coupled to a video interface, the video interface including a coaxial connector to access the video information; and
- a bidirectional signaling interface coupled to the first ultra wide band receiver and to the second ultra wide band receiver.

2. The system of claim 1, wherein the ultra wide band communication device further comprises a wireless receiver, wherein the wireless receiver is configured to receive a third electrical signal from a user access device, the third electrical signal having an ultra wide band characteristic.

3. The system of claim 2, wherein the ultra wide band communication device is further configured to convert the third electrical signal received from the user access device into a third optical signal.

4. The system of claim 1, wherein the wavelength division multiplexer is directly coupled to each of the optical signal to electrical signal converters.

5. The system of claim 1, wherein the ultra wide band communication device uses pulse position modulation.

6. The system of claim 1, wherein the ultra wide band communication device uses an ultra wide band modulation technique that is responsive to the received optical signal.

7. A method of wirelessly distributing video, voice, and data by a short range, centrally located ultra wide band communications system to a plurality of nearby dwellings powered by a commercial electrical grid, the method comprising:
- receiving, at the ultra wide band communications system, an optical signal from an optical cable of a passive optical network that provides the video, the voice, and the data to the ultra wide band communications system, the optical cable including a non-metallic inner sheath and optical insertion points, the optical signal including an optical carrier signal multiplexed using at least a first wavelength and a second wavelength, wherein the optical signal comprises a first optical signal at the first wavelength including the voice and the data and a second optical signal at the second wavelength including the video;
- converting the first optical signal into a first electrical signal including the voice and the data;
- converting the second optical signal into a second electrical signal including the video;
- wirelessly transmitting to the plurality of nearby dwellings a first ultra wide band signal responsive to the first electrical signal via a passive optical network to ultra wide band interface that includes an ultra wide band transceiver and an antenna, the first ultra wide band signal including the voice and data information, wherein the ultra wide band transceiver includes an ultra wide band modulator, wherein the ultra wide band transceiver has a bandwidth of at least 2 GHz;
- wirelessly transmitting to the plurality of nearby dwellings a second ultra wide band signal responsive to the second electrical signal via the passive optical network to ultra wide band interface, the second ultra wide band signal including the video,
- wherein the first ultra wide band signal and the second ultra wide band signal are wirelessly transmitted to a user access device in at least one of the plurality of nearby dwellings, the user access device including a second antenna, a first ultra wide band receiver and an ultra wide band transmitter coupled to an interface, the interface including an RJ45 connector to access the data and an RJ11 connector to access the voice, a second ultra wide band receiver coupled to a video interface, the video interface including a coaxial connector to access the video, and a bidirectional signaling interface coupled to the first ultra wide band receiver and to the second ultra wide band receiver; and
- receiving, at the ultra wide band communications system, power from at least one of a connection to the commercial electrical grid, a backup battery, and a solar panel, the power received at a fiber cable insertion point of the ultra wide band communications system, wherein the power is provided to the passive optical network to ultra wide band interface via a set of interstitial gauged copper pairs,
- wherein a pedestal-type equipment housing houses the ultra wide band communications system.

8. The method of claim 7, further comprising:
- receiving a third ultra wide band signal from the user access device; and
- producing a third optical signal responsive to the third ultra wide band signal received from the user access device.

9. The method of claim 8, further comprising transmitting the third optical signal to the optical cable.

10. The method of claim 8, further comprising:
- receiving a fourth ultra wide band signal from a second user access device; and
- producing a fourth optical signal responsive to the fourth ultra wide band signal received from the second user access device.

11. The method of claim 10, further comprising transmitting the fourth optical signal to the optical cable.

* * * * *